(12) United States Patent
Wang

(10) Patent No.: US 9,989,179 B2
(45) Date of Patent: *Jun. 5, 2018

(54) ATTACHMENT FOR DIFFERENT AIR VALVE

(71) Applicant: Beto Engineering & Marketing Co., Ltd., Taichung (TW)

(72) Inventor: Lo Pin Wang, Taichung (TW)

(73) Assignee: BETO ENGINEERING & MARKETING CO., LTD., Taichung (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/076,972

(22) Filed: Mar. 22, 2016

(65) Prior Publication Data

US 2017/0276277 A1   Sep. 28, 2017

(51) Int. Cl.
*F16K 15/20* (2006.01)
*F16L 37/18* (2006.01)
*B60S 5/04* (2006.01)

(52) U.S. Cl.
CPC .............. *F16L 37/18* (2013.01); *B60S 5/04* (2013.01); *F16K 15/20* (2013.01); *Y10T 137/3724* (2015.04)

(58) Field of Classification Search
CPC ........ F16K 31/602; F16K 11/04; F16K 15/20; F16K 15/207; F16K 1/04; F16K 3/262; F16K 3/267; F16L 37/18; F16L 37/28; B60C 23/10; B60C 29/06; B60C 29/064; Y10T 137/2584; Y10T 137/3584; Y10T 137/3724; Y10T 137/5196; Y10T 137/5283; F04B 33/00; F04B 33/005; B60S 5/04
USPC ................... 137/223, 231; 251/149.6, 149.8; 417/569

See application file for complete search history.

(56) References Cited

U.S. PATENT DOCUMENTS

| | | |
|---|---|---|
| 5,645,100 A | 7/1997 | Chuang et al. |
| 5,683,234 A | 11/1997 | Chuang et al. |
| 5,749,392 A | 5/1998 | Glotin |
| 6,105,600 A | 8/2000 | Wang |
| 6,105,601 A | 8/2000 | Wang |
| 6,146,116 A | 11/2000 | Wu et al. |
| 6,289,920 B1 | 9/2001 | Wang |
| 6,328,057 B1 | 12/2001 | Wang |
| 7,866,335 B2 | 1/2011 | Wang |
| 9,206,916 B1 * | 12/2015 | Wang ................... F16K 15/207 |

(Continued)

*Primary Examiner* — Craig J Price
(74) *Attorney, Agent, or Firm* — Che-Yang Chen; Law Offices of Scott Warmuth

(57) ABSTRACT

An air valve connecting device or attachment includes a mouth engaged in a housing and having a compartment for engaging with either a US or French inflation valve, an actuator slidably engaged in the housing and engageable with the mouth, a tube slidably engaged in the actuator for selectively engaging with the inflation valve, and extendible into the mouth for selectively engaging with the other inflation valve, one or more catches are slidably engaged in the actuator and engageable into the actuator for engaging with the tube and for retaining the tube to the actuator, and a cam member is engageable with the actuator for forcing the actuator to compress the mouth and to grasp the inflation valve to the housing.

11 Claims, 8 Drawing Sheets

(56) References Cited

U.S. PATENT DOCUMENTS

| | | | |
|---|---|---|---|
| 9,388,914 B2* | 7/2016 | Wang | F16K 31/602 |
| 2004/0187960 A1* | 9/2004 | Kemppainen | F04B 33/005 |
| | | | 141/383 |

* cited by examiner

ATTACHMENT FOR DIFFERENT AIR VALVE

BACKGROUND OF THE INVENTION

1. Field of the Invention

The present invention relates to an air valve connecting head or device or attachment, and more particularly to an air valve connecting device or attachment including an improved structure for easily and quickly connecting to different inflation valves without removing and changing the parts or elements or structure of the air valve connecting attachment.

2. Description of the Prior Art

Typical air valve connecting devices or attachments comprise one or more fitting ports or mouths formed or provided in a valve housing for receiving or engaging with inflation valves or nozzles and for selectively inflating various kinds of balls, inner tires of the bicycles or the motorcycles or the vehicles, or other inflatable articles. Normally, the inflation valves or nozzles may comprise different structures, such as the U.S. type inflation valve or the French type inflation valve, or the like for inflating different tires of the bicycles or the motorcycles or the vehicles.

For example, U.S. Pat. No. 5,683,234 to Chuang et al., U.S. Pat. No. 5,645,100 to Chuang et al., U.S. Pat. No. 5,749,392 to Glotin, U.S. Pat. No. 6,105,600 to Wang, U.S. Pat. No. 6,105,601 to Wang, U.S. Pat. No. 6,146,116 to Wu et al., U.S. Pat. No. 6,289,920 to Wang, U.S. Pat. No. 6,328,057 to Wang, and U.S. Pat. No. 7,866,335 to Wang disclose several of the typical hand operated, dual chambered, pneumatic pumps comprising a fitting member or attachment for selectively or alternatively engaging with different nozzles or tire valves, such as the U.S. type inflation valve or the French type inflation valve, or the like.

However, the typical air valve connecting heads or fittings or attachments comprise a structure that may not be easily operated by the user or may not effectively grasping or holding the different inflation valves, and may have an air leaking problem occurred through either the inflation valve or the attachment.

The present invention has arisen to mitigate and/or obviate the afore-described disadvantages of the conventional air valve connecting devices or attachments.

SUMMARY OF THE INVENTION

The primary objective of the present invention is to provide an air valve connecting device or attachment including an improved structure for easily and quickly connecting to different inflation valves without changing the parts or elements or structure of the air valve connecting attachment.

In accordance with one aspect of the invention, there is provided an air valve connecting device comprising a housing including a chamber formed therein for receiving a pressurized air, a mouth engaged in a lower portion of the housing, and including a compartment formed in the mouth for engaging with either a first inflation valve or a second inflation valve, an actuator slidably engaged in the housing and engageable with the mouth, and the actuator including a bore formed therein, and including a groove laterally formed in the actuator and communicating with the bore of the actuator, a tube slidably engaged in the bore of the actuator for selectively engaging with the second inflation valve, and extendible into the compartment of the mouth for selectively engaging with the first type valve, at least one catch slidably received and engaged in the groove of the actuator and engageable into the bore of the actuator for selectively engaging with the tube and for selectively retaining the tube to the actuator and for selectively engaging the tube with the first type valve, and a cam member pivotally attached to the housing and engageable with the actuator for selectively forcing the actuator to compress the mouth and to grasp either the first inflation valve or the second inflation valve to the housing and for allowing the an air valve connecting device to be easily and quickly connected to different inflation valves without changing the parts or elements or structure of the air valve connecting attachment.

The housing includes a passage laterally formed therein and communicating with the chamber of the housing for slidably receiving and engaging with the catch and for allowing the catch to be moved out through the passage of the housing selectively. The housing includes a spring biasing element engaged in the actuator and engaged with the catch for biasing and forcing the catch to move out through the passage of the housing selectively.

The housing includes a control ferrule rotatably engaged onto the housing, and the control ferrule includes a peripheral recess formed therein for slidably receiving and engaging with the catch, and at least one protrusion extended into the peripheral recess of the control ferrule for selectively engaging with the catch and for moving the catch into the bore of the actuator.

The housing includes a curved guiding channel formed therein, and the control ferrule includes a projection extended therefrom and slidably engaged in the guiding channel of the housing for guiding and limiting the control ferrule to pivot or rotate relative to the housing. The housing includes a mark formed or provided thereon for selectively aligning with the projection of the control ferrule and for indicating the type of the inflation valve that is to be engaged with.

The control ferrule includes an indicator formed in the projection for selectively aligning with the mark of the housing and for indicating the type of the inflation valve that is to be engaged with. The housing includes a cover attached to the housing and engaged with the control ferrule for rotatably retaining the control ferrule to the housing.

The tube includes a cavity formed therein for engaging with a spring biasing member which is engaged between the actuator and the tube for biasing and moving the tube into the compartment of the mouth selectively. The cam member is pivotally attached to the housing with an axle. The cam member includes a handle extended from the cam member for rotating the cam member relative to the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
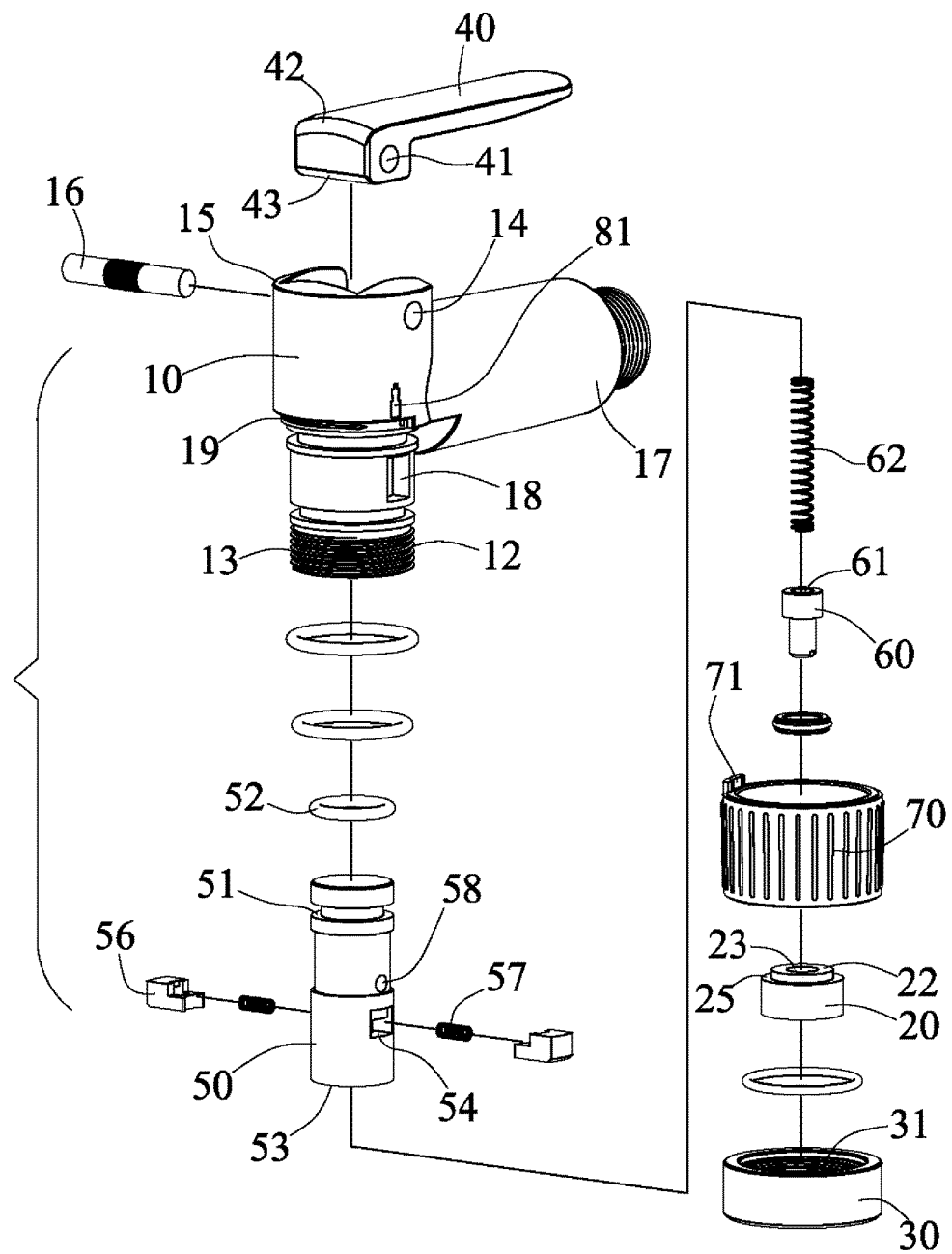
FIG. 1 is an exploded view of an air valve connecting device or attachment in accordance with the present invention.
Figure 2:
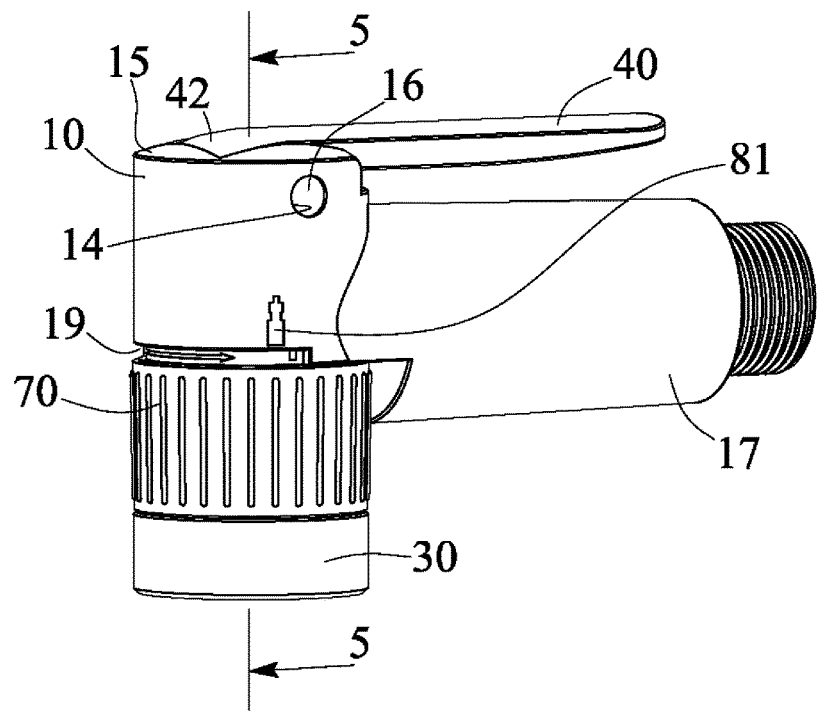
FIG. 2 is a perspective view of the air valve connecting device or attachment.
Figure 3:
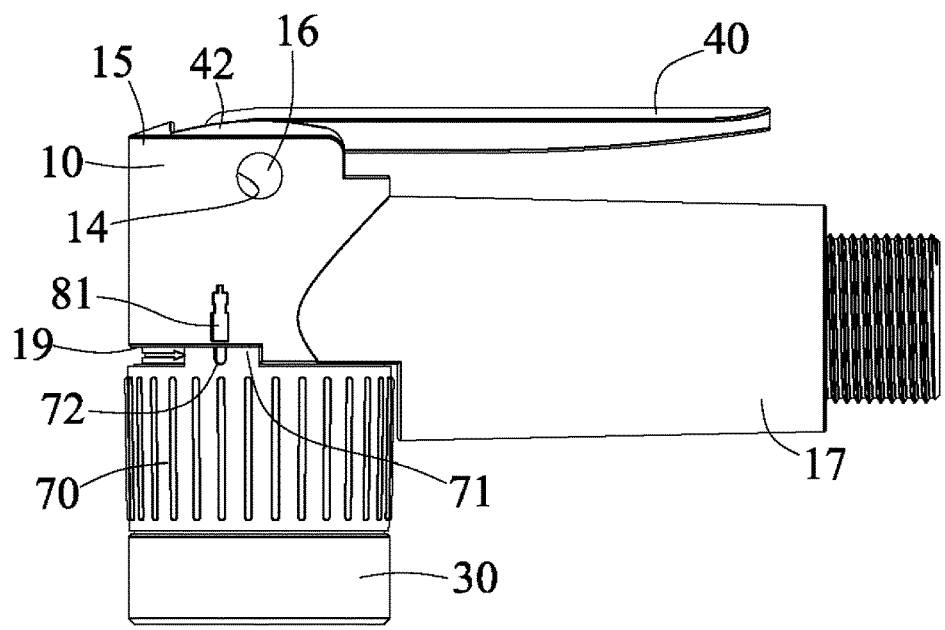
FIG. 3 is a right side plan schematic view of the air valve connecting device or attachment.
Figure 4:
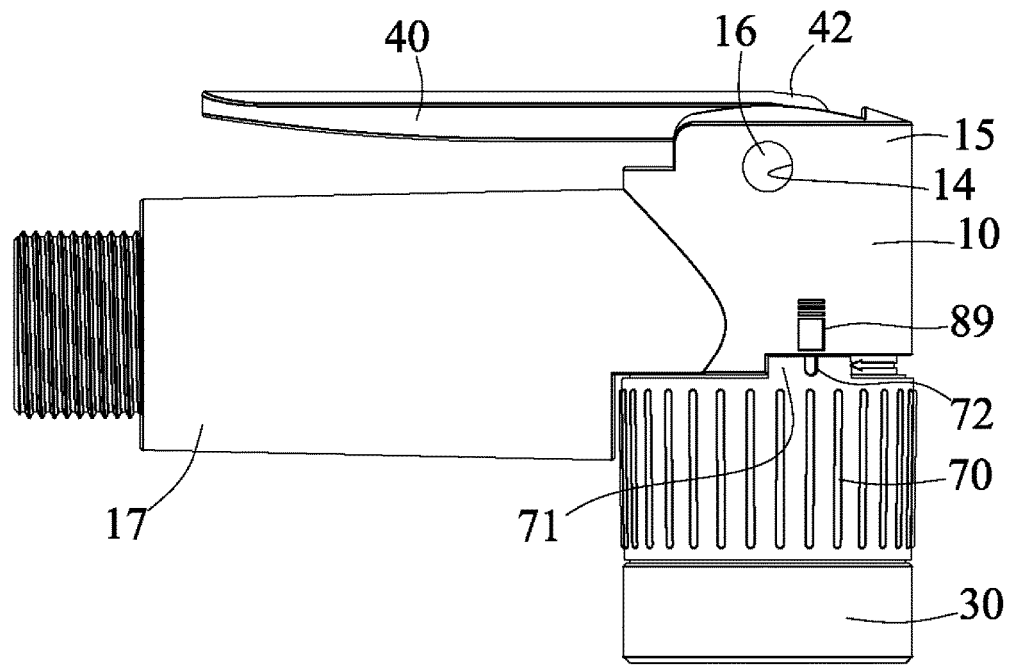
FIG. 4 is a left side plan schematic view of the air valve connecting device or attachment.

Referring to the drawings, and initially to FIGS. 1-6, an air valve connecting device or attachment in accordance with the present invention comprises a head body or outer housing 10 including a chamber 11 formed therein, and including an outer thread 12 formed in the first end or one end or the lower portion 13 thereof, and including a lateral orifice 14 formed therein, such as formed in the other one end or the upper portion 15 of the housing 10 and communicating with the chamber 11 of the housing 10 for receiving or engaging with an axle 16 which is laterally extended through the chamber 11 of the housing 10, and including a cylindrical casing 17 laterally extended from the housing 10 and substantially perpendicular to the housing 10 for coupling to an air pump (not shown) or the like, and for supplying a pressurized air into the chamber 11 of the housing 10.

An elastic grasping member or mouth 20 is to be attached or engaged into the one end or the lower portion 13 of the housing 10, and includes a stud 22 extended upwardly from the mouth 20 and having a bore 23 formed in the stud 22, and includes a compartment 24 formed in the mouth 20 (FIGS. 5, 7, 8) and having an inner diameter greater than that of the bore 23 of the stud 22. The mouth 20 includes an outer diameter greater than that of the stud 22 for forming an outer peripheral shoulder 25 between the mouth 20 and the stud 22. It is preferable that the mouth 20 is made of soft or elastic materials, such as rubber, plastic or other synthetic materials for resiliently grasping the inflation valves 80, 88, such as the first or U.S. type inflation valve 88 (FIGS. 11, 12) and the second or French type inflation valve 80 (FIGS. 7 and 8) to the housing 10 when the mouth 20 is compressed to engage with either of the inflation valves 80, 88.

A cover 30 includes an inner thread 31 formed therein (FIG. 1) for engaging with the outer thread 12 of the housing 10 and for detachably attaching or securing the cover 30 to the housing 10, and the cover 30 may be engaged with the mouth 20 for solidly anchoring or securing the mouth 20 to the housing 10. The cover 30 includes an opening 32 formed therein (FIGS. 7-8, 11-12) and having an inner diameter greater than that of the compartment 24 of the mouth 20 (FIG. 5) for receiving or engaging with the inflation valves 80, 88, and for allowing the inflation valves 80, 88 to be engaged into the compartment 24 of the mouth 20 and/or engaged into the bore 23 of the stud 22 (FIGS. 7, 8), and thus for allowing the inflation valves 80, 88 to be resiliently grasped or held or secured to the housing 10 with the mouth 20 when the mouth 20 is compressed or actuated.

An actuating handle 40 includes an aperture or hole 41 formed therein, such as formed in the one end 42 thereof for receiving or engaging with the axle 16 and for pivotally or rotatably attaching or securing the handle 40 to the housing 10 and for allowing the actuating handle 40 to be rotated relative to the housing 10 to selected angular positions. The handle 40 includes a cam member 43 formed or provided on the one end 42 thereof, or the handle 40 is extended from the cam member 43. An actuating member or actuator 50 is slidably engaged in the other one end or the upper portion 15 of the housing 10, and includes a peripheral depression 51 formed in the outer peripheral portion thereof for receiving or engaging with a sealing ring 52 and for engaging with the inner peripheral portion of the housing 10 and for making a water tight or air tight seal between the actuator 50 and the housing 10.

Figure 5:
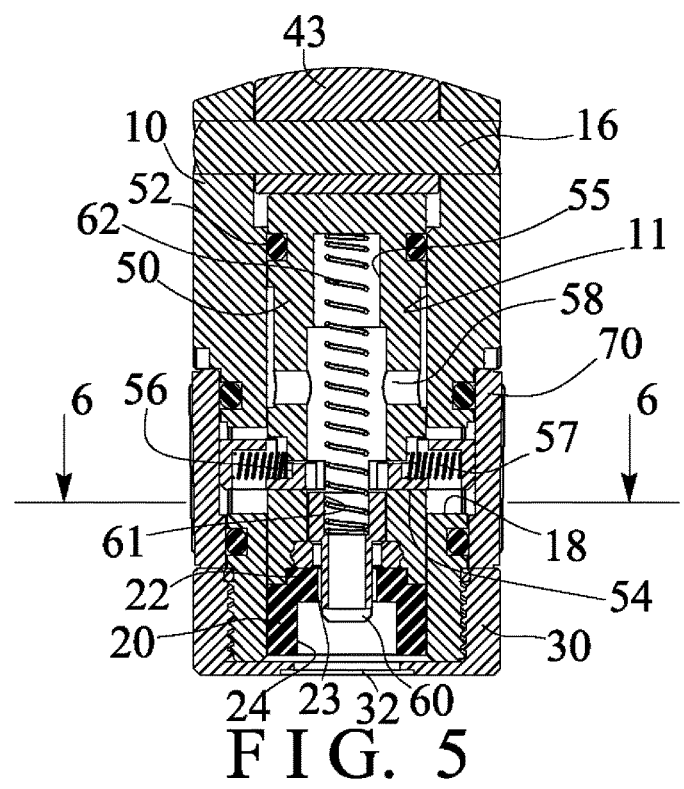
FIG. 5 is a cross sectional view of the air valve connecting device or attachment taken along lines 5-5 of FIG. 2.
Figure 7:
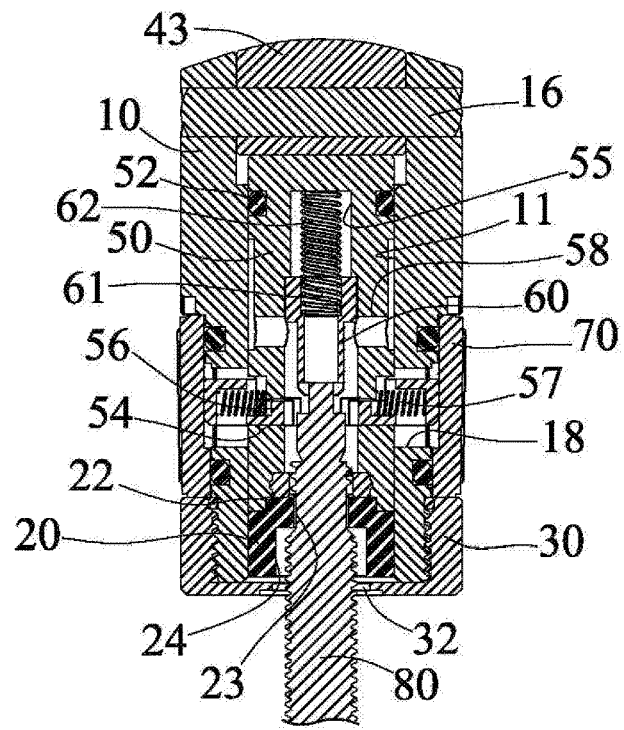
FIGS. 7, 8 are other cross sectional views similar to FIG. 5, illustrating the operation of the air valve connecting device or attachment for engaging with one type of the nozzles or tire valves.
Figure 8:
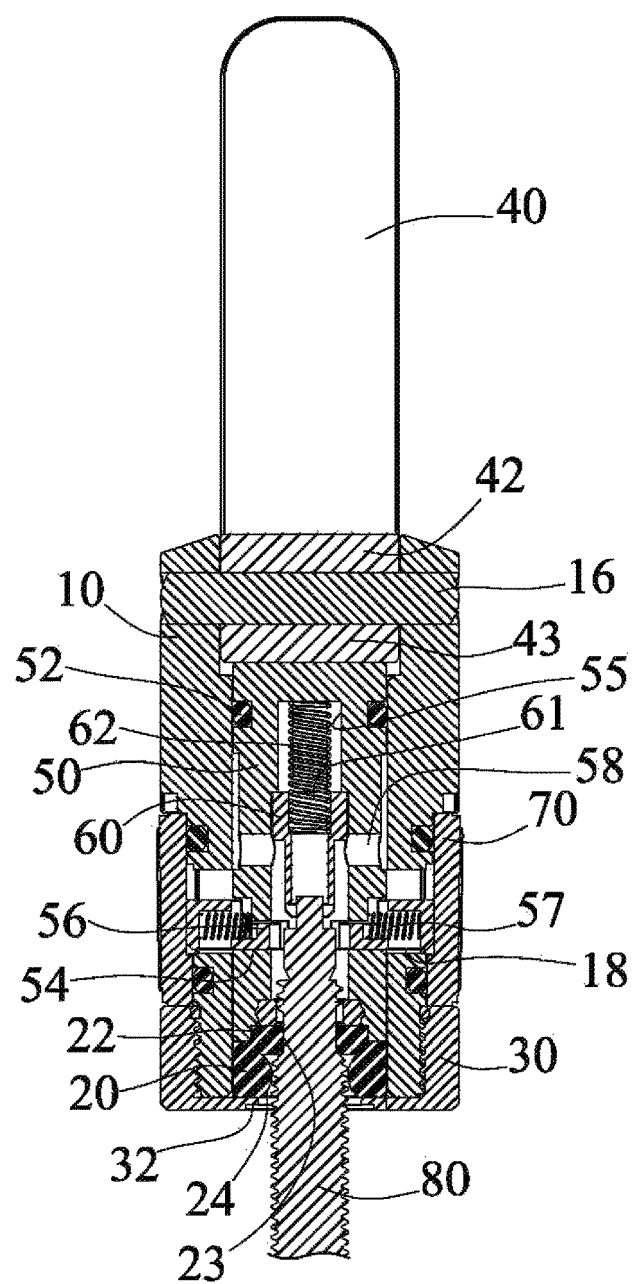

The actuator 50 includes a first end or one end or a lower portion 53 for contacting or engaging with the mouth 20 and for compressing or squeezing the mouth 20 to grasp or hold the inflation valves 80, 88, and includes a groove 54 laterally formed therein and intersecting or communicating with the bore 55 of the actuator 50 for slidably receiving or engaging with one or more (such as two) catches 56, such as spring biased catches 56. Or, one or more (such as two) spring biasing elements 57 are provided and engaged in the actuator 50, and contacted or engaged with the catches 56 respectively for biasing and forcing or disengaging or moving the catches 56 away from the bore 55 of the actuator 50 selectively (FIGS. 5, 7, 8).

As shown in FIGS. 1, and 5-12, the housing 10 includes a passage 18 laterally formed therein and communicating with the chamber 11 of the housing 10 for slidably receiving or engaging with the catches 56 and for allowing the catches 56 to be biased by the spring biasing elements 57 and to be moved out through the passage 18 of the housing 10 selectively (FIGS. 5-8). The housing 10 further includes a curved or peripheral guiding channel 19 formed in the upper portion 15 of the housing 10 and extended for about one half of the outer peripheral portion of the housing 10, and one or more (such as two) signs or marks 81, 89 formed or provided on the outer peripheral portion of the housing 10, and located close to the two end portions of the guiding channel 19 of the housing 10. The actuator 50 includes a pathway 58 formed therein and communicating with the chamber 11 of the housing 10 and the casing 17 for allowing the pressurized air from the air pump (not shown) to flow through the casing 17 and to flow into the chamber 11 of the housing 10, and then to flow into the bore 55 of the actuator 50 selectively.

Figure 10:
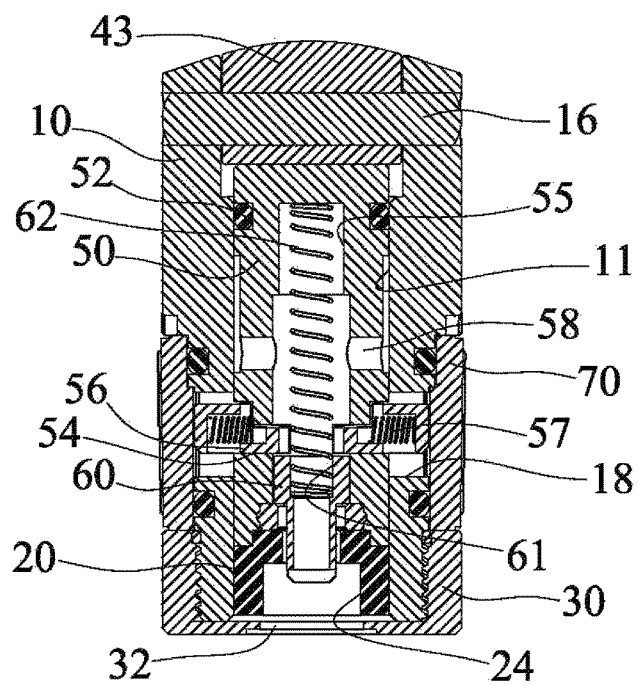
FIGS. 10, 11, 12 are further cross sectional views similar to FIGS. 5, 7, 8, illustrating the operation of the valve connecting device or attachment for engaging with different type of the nozzles or tire valves.
Figure 11:
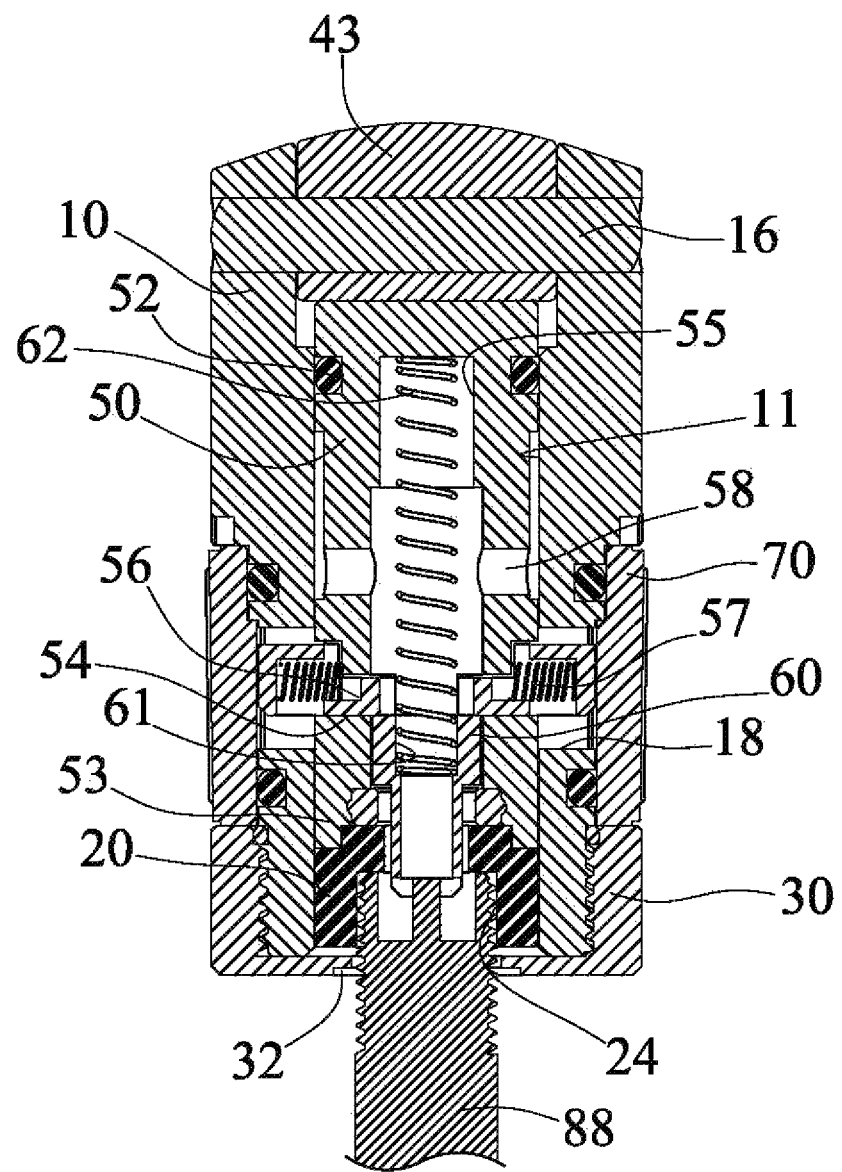
Figure 12:
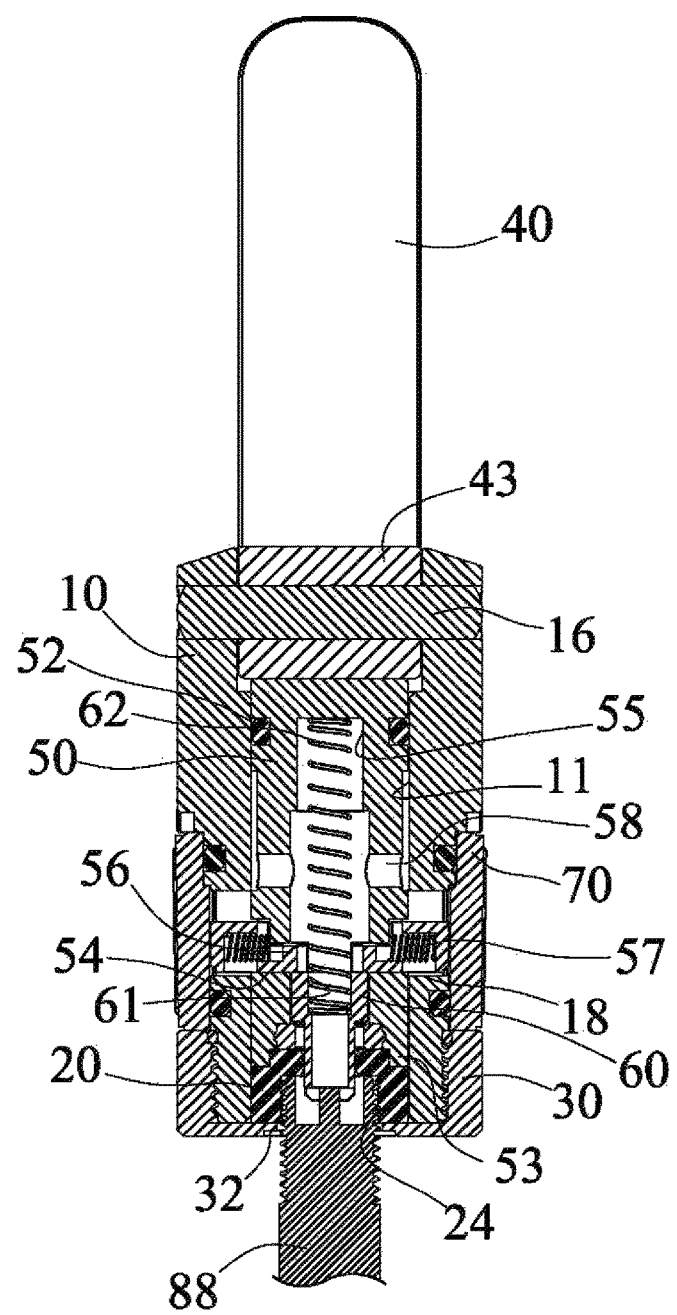

A valve pressing member or tube 60 is slidably engaged in the bore 55 of the actuator 50 for selectively engaging with the French type inflation valve 80 (FIGS. 7, 8), and is slidable or extendible into the compartment 24 of the mouth 20 for selectively engaging with the U.S. type inflation valve 88 (FIGS. 11-12), and includes a cavity 61 formed therein for receiving or engaging with another spring biasing member 62 which is engaged with the actuator 50 and/or engaged between the actuator 50 and the tube 60 for selectively biasing or forcing the tube 60 into the bore 23 of the stud 22 and/or the compartment 24 of the mouth 20 and for selectively engaging with either the U.S. type inflation valve 88 or the French type inflation valve 80. The catches 56 may be moved to engage with the tube 60 for solidly and stably anchoring or retaining the tube 60 to the actuator 50 (FIGS. 10-12).

Figure 6:
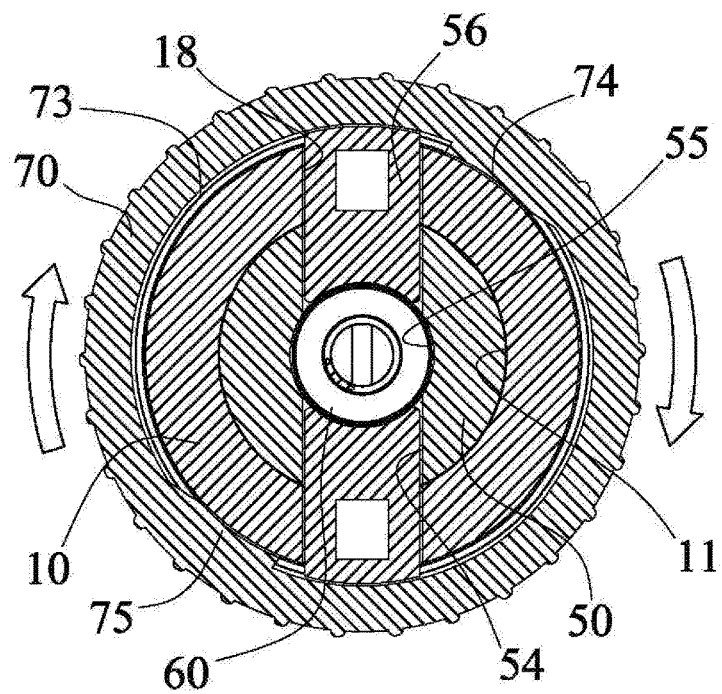
FIG. 6 is a cross sectional view of the air valve connecting device or attachment taken along lines 6-6 of FIG. 5.
Figure 9:
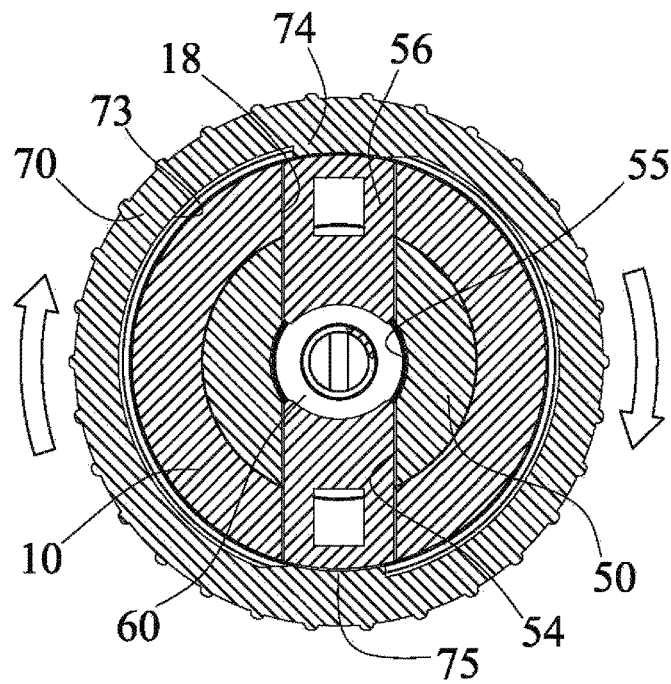
FIG. 9 is another cross sectional views similar to FIG. 6, illustrating the operation of the air valve connecting device or attachment.

A sleeve or control ferrule 70 is pivotally or rotatably engaged onto the lower portion 13 of the housing 10 and anchored or retained or positioned on or around the housing 10 with the cover 30, and the control ferrule 70 includes a key or projection 71 extended therefrom and slidably engaged in the guiding channel 19 of the housing 10 for guiding and limiting the control ferrule 70 to pivot or rotate relative to the housing 10. The control ferrule 70 may further include a mark or indicator 72 formed or provided thereon, such as formed in the projection 71 for selectively aligning with either of the marks 81, 89 of the housing 10 (FIGS. 3, 4) when the projection 71 is engaged with either of the end portions of the guiding channel 19 of the housing 10. As shown in FIGS. 6 and 9, the control ferrule 70 includes a peripheral recess 73 formed therein for slidably receiving or engaging with the catches 56, and one or more (such as two) cam elements or protrusions 74, 75 extended into the peripheral recess 73 of the control ferrule 70 and located opposite to each other.

In operation, as shown in FIGS. 4 and 9-12, the control ferrule 70 may be pivoted or rotated relative to the housing 10 to have the projection 71 and/or the indicator 72 aligned with one of the marks 89 of the housing 10 (FIG. 4), at this moment, as shown in FIG. 9, the protrusions 74, 75 are engaged with the catches 56 for forcing and moving the catches 56 to engage into the bore 55 of the actuator 50 and to engage with the tube 60 and to anchor or retain the tube 60 in the lower portion 53 of the actuator 50, and a U.S. type inflation valve 88 may be engaged through the opening 32 of the cover 30 and may be engaged into the compartment 24 of the mouth 20 and to engage with the tube 60. The cam member 43 may then be forced to engage with the actuator 50 (FIG. 12) by rotating the actuating handle 40 relative to the actuator 50 and the housing 10 to the perpendicular working position, at this moment, the actuator 50 may be forced to move downwardly toward the mouth 20 and to force the mouth 20 to solidly engage with and grasp the U.S. type inflation valve 88.

Alternatively, as shown in FIGS. 3 and 5-8, the control ferrule 70 may also be pivoted or rotated relative to the housing 10 to have the projection 71 and/or the indicator 72 aligned with the other mark 81 of the housing 10 (FIG. 3), at this moment, as shown in FIG. 6, the catches 56 are engaged with the peripheral recess 73 of the control ferrule 70 and offset or separated from the protrusions 74, 75, and also offset or separated from the bore 55 of the actuator 50 for allowing the tube 60 to be moved and engaged into the upper portion 59 of the bore 55 or of the actuator 50 with or by the French type inflation valve 80, the French type inflation valve 80 may be engaged through the opening 32 of the cover 30 and may be engaged into the compartment 24 of the mouth 20 and may also be engaged into the bore 55 of the lower portion 53 of the actuator 50, and may force the tube 60 to compress the spring biasing member 62. The cam member 43 may then be forced to engage with the actuator 50 by rotating the actuating handle 40 relative to the actuator 50 and the housing 10 to the perpendicular working position (FIG. 8), at this moment, the actuator 50 may be forced to move downwardly toward the mouth 20 and to force the mouth 20 to solidly engage with and grasp the French type inflation valve 80 to the actuator 50 and the housing 10.

Accordingly, the air valve connecting device or attachment in accordance with the invention includes an improved structure for easily and quickly connecting different inflation valves without removing and changing the parts or elements or structure of the air valve connecting attachment.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
a housing including a chamber formed in said housing for receiving a pressurized air,
a mouth engaged in a lower portion of said housing, and including a compartment formed in said mouth for engaging with either a first inflation valve or a second inflation valve,
an actuator slidably engaged in said housing and engageable with said mouth, and said actuator including a bore formed in said actuator, and including a groove laterally formed in said actuator and communicating with said bore of said actuator,
a tube slidably engaged in said bore of said actuator for selectively engaging with said second inflation valve, and extendible into said compartment of said mouth for selectively engaging with said first inflation valve,
at least one catch slidably received and engaged in said groove of said actuator and engageable into said bore of said actuator for selectively engaging with said tube and for selectively retaining said tube to said actuator, and
a cam member pivotally attached to said housing and engageable with said actuator for selectively forcing said actuator to compress said mouth and to grasp either said first inflation valve or said second inflation valve to said housing.

2. The air valve connecting device as claimed in claim 1, wherein said housing includes a passage laterally formed in said housing and communicating with said chamber of said housing for slidably receiving and engaging with said at least one catch and for allowing said at least one catch to be moved out through said passage of said housing selectively.

3. The air valve connecting device as claimed in claim 2, wherein said housing includes a spring biasing element engaged in said actuator and engaged with said at least one catch for biasing and forcing said at least one catch to move out through said passage of said housing selectively.

4. The air valve connecting device as claimed in claim 1, wherein said housing includes a control ferrule rotatably engaged onto said housing, and said control ferrule includes a peripheral recess formed in said control ferrule for slidably receiving and engaging with said at least one catch, and at least one protrusion extended into said peripheral recess of said control ferrule for selectively engaging with said at least one catch and for moving said at least one catch into said bore of said actuator.

5. The air valve connecting device as claimed in claim 4, wherein said housing includes a guiding channel formed in said housing, and said control ferrule includes a projection extended from said control ferrule and slidably engaged in said guiding channel of said housing for guiding and limiting said control ferrule to rotate relative to said housing.

6. The air valve connecting device as claimed in claim 5, wherein said housing includes a mark provided on said housing for selectively aligning with said projection of said control ferrule.

7. The air valve connecting device as claimed in claim 6, wherein said control ferrule includes an indicator formed in said projection for selectively aligning with said mark of said housing.

8. The air valve connecting device as claimed in claim 4, wherein said housing includes a cover attached to said housing and engaged with said control ferrule for rotatably retaining said control ferrule to said housing.

9. The air valve connecting device as claimed in claim 1, wherein said tube includes a cavity formed in said tube for engaging with a spring biasing member which is engaged between said actuator and said tube for biasing said tube into said compartment of said mouth.

10. The air valve connecting device as claimed in claim 1, wherein said cam member is pivotally attached to said housing with an axle.

11. The air valve connecting device as claimed in claim 1, wherein said cam member includes a handle extended from said cam member.

* * * * *